W. A. SALTER.
CLAMP.
APPLICATION FILED DEC. 30, 1918.

1,306,858.

Patented June 17, 1919.
2 SHEETS—SHEET 1.

WITNESSES:

INVENTOR.

UNITED STATES PATENT OFFICE.

WILLIAM A. SALTER, OF KANSAS CITY, MISSOURI.

CLAMP.

1,306,858.　　　　Specification of Letters Patent.　　Patented June 17, 1919.

Application filed December 30, 1918. Serial No. 269,002.

*To all whom it may concern:*

Be it known that I, WILLIAM A. SALTER, a citizen of the United States of America, residing at Kansas City, in the county of Jackson and State of Missouri, have invented certain new and useful Improvements in Clamps, of which the following is a specification.

My invention relates to clamps for the use of oxy-acetylene welders, and has for its object the holding of different parts or pieces of metal together in their respective positions, while they are being welded by the operator.

To attain this end it is necessary for general application that the clamps be able to grip onto and hold rigidly pieces of different shapes and dimensions, and in order to do this, the clamps must not only be able to grip onto the different parts, but the gripping devices must be able to be set at different angles and positions from each other, and after being set, locked in such positions.

The subject matter claimed is hereinafter set forth, references being had to the accompanying drawings.

Figure 2:
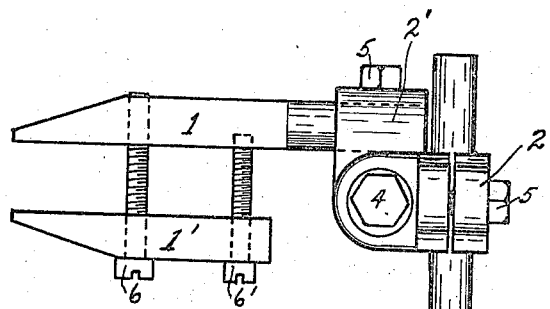
Fig. 2, is a central sectional view of the swivel clamping joints.
Figure 2:
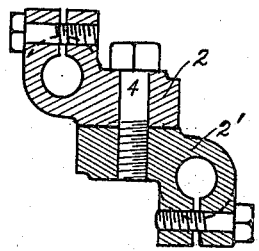
Figure 1:
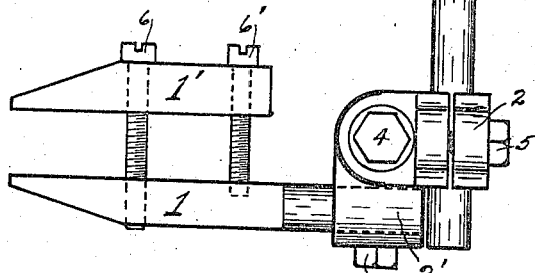
Figure 1, represents as assembled whole of the clamp having two pair of gripping jaws and connecting parts.

In Fig. 1, the two clamping jaws 1 and 1' form a single clamping device of the mechanism, and are a well known construction, the two jaws being clamped together by means of the screws 6 and 6'. The jaw 1 at its rear end is turned cylindrical, preferably to the same size as the supporting shaft 3, for manufacturing purposes. The two complete clamping devices are engaged through the supporting shaft 3, by means of the swiveling and locking joints 2 and 2': The two pieces of this joint are of the same shape and construction except that 2 is bored to allow it to turn freely on the screw 4, while 2' is threaded and holds the threads of the screw 4, so that when the screw 4 is loosened, the joint swings freely, but when the screw 4 is tightened then the two parts are locked rigidly together by frictional contact of the faces. The pieces of this joint 2 and 2' also are bored and slotted as shown in Fig. 2 to receive the cylindrical end of the jaw 1, or of the supporting shaft 3, and this hole is of the proper size to allow them both to turn and slip on their respective parts when the screws 5 are loosened, but when these screws 5 are tightened, then they are locked rigidly together, through frictional gripping contact wherever they are set.

Figure 3:
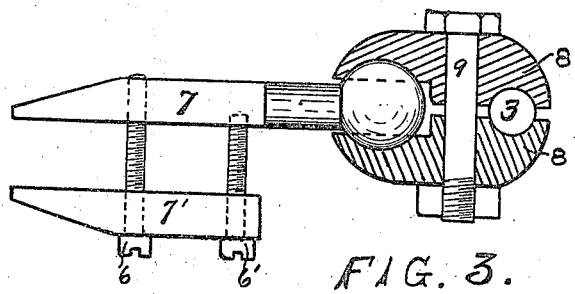
Fig. 3, is a mechanical variation of the clamp and swiveling hinge joints but embodying this invention.

In Fig. 3 a mechanical variation is shown, wherein the jaw 7 has a ball at the rear end of it, that engages with a socket in the two pieces of the swiveling clamping pieces 8 and 8' the joint being loosened and locked by means of the bolt 9 as shown.

The particular novel part of this mechanism is its extreme simplicity of construction, and cheapness of manufacture, yet such is its operation, that there is absolutely no position or angle relative to each other, that the clamping devices cannot be placed and locked. Hence it does not matter how irregular the pieces of metal to be welded are, with its use they can be brought and held together for welding and handled during the work without losing their positions, and its advantages to the advancement of the welding art are obvious.

In operation, the two clamping devices composed of jaws 1 and 1', are fastened or gripped onto the pieces to be welded (assuming there are only two pieces) by means of the screws 6 and 6' after the screws 5 and 4 are loosened. Then the pieces to be welded together are adjusted until the edges to be welded are in their proper positions, the universal movements of the joints allowing this to be done, when the screws 5 and 4 are tightened, locking the whole rigidly together, and ready for the welding operation.

Where more than two pieces are to be placed at one time for welding, another clamping device can be placed on the one supporting shaft 3, or another supporting shaft can be extended on through the use of more clamping joints, and the clamping device locked onto this extra shaft, the entire mechanism being capable of any extension to meet any needs.

I claim as my invention and desire to secure by Letters Patent:

1. In an oxy-acetylene welders clamp, the combination of a number of clamping devices, each having a gripping jaw and a mounting jaw with a cylindrical end parallel to the axial line of the jaws, a supporting shaft, and a number of swiveling locking joints comprised of two parts, each part having a sleeved portion and a circular plane surface that is off-set from and parallel to the sleeved portion, one part of these sleeved swiveling joints engaging with the supporting shaft, and the other part of the swiveling joints engaging with the cylindrical ends of the mounting jaws of the clamping devices.

2. In an oxy-acetylene welders clamp, the combination of a number of swiveling joints consisting of two similar parts, each part having a sleeved portion and a circular plane surface that is off-set from and parallel to the axis of the sleeved portion, a locking bolt in the center of the plane surfaces, and around the axis of which the two parts of the swiveling joint rotates, a number of clamping devices engaging with the sleeved portion of one part of the swiveling joints, a supporting shaft engaging with the sleeved portion of the other part of the swiveling joints, and means for locking the entire mechanism together as a rigid whole.

3. In an oxy-acetylene welders clamp, the combination of a number of swiveling joints each comprising two parts, each part having a sleeved portion and a circular plane surface that is off-set from and parallel to the axis of the sleeve portion, a locking bolt in the center of the circular plane surface and at right angles thereto and around the axis of which the two parts of the swiveling joint rotate, a number of clamping devices engaging with the sleeved portion of one part of the swiveling joints, a supporting shaft engaging with the sleeved portion of the other part of the swiveling joints, means for adjusting the positions of the clamping devices, and means for locking the joints.

In testimony whereof I have signed my name to this specification in the presence of two subscribing witnesses.

WILLIAM A. SALTER.

Witnesses:
M. A. SALTER,
J. H. PATTERSON.

Copies of this patent may be obtained for five cents each, by addressing the "Commissioner of Patents, Washington, D. C."